Feb. 2, 1937.   P. D. MERRILL   2,069,722
PIPE LEAK SEALING GASKET
Filed Feb. 27, 1936
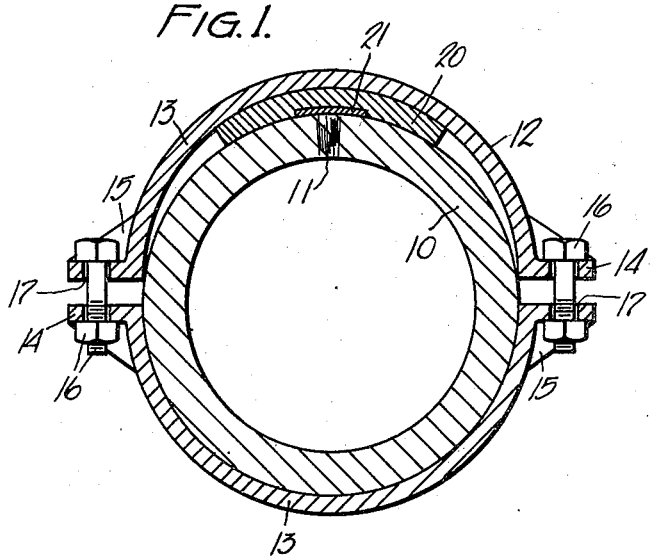
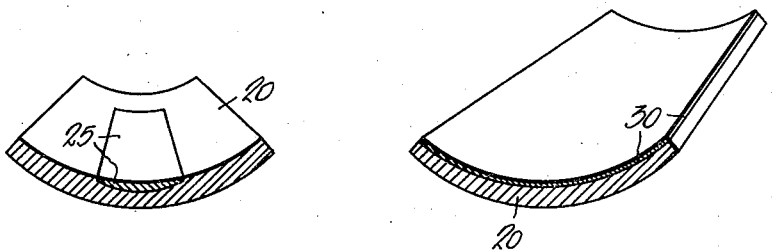
INVENTOR.
PATTERSON D. MERRILL.
BY Oltsch & Knoblock
ATTORNEYS.

Patented Feb. 2, 1937

2,069,722

UNITED STATES PATENT OFFICE 2,069,722

PIPE LEAK SEALING GASKET

Patterson D. Merrill, South Bend, Ind., assignor to M. B. Skinner Company, South Bend, Ind.

Application February 27, 1936, Serial No. 66,013

2 Claims. (Cl. 138—99)

This invention relates to pipe leak sealing gaskets, and particularly to gaskets adapted to seal a leak in the body of a pipe.

Heretofore gaskets of this character, which are commonly formed of rubber, have been shaped with side portions of reduced thickness to compensate for the substantially crescent-shaped gasket receiving space between the pipe and the pipe encircling clamp which presses the gasket against the pipe; but these gaskets have been formed substantially flat. Thus to apply the gasket to the pipe the gasket was bent into conformity with the curvature of the outer surface of the pipe, which bending placed the gasket under stretch and held it in this stretched relation throughout its entire use. This continuous stretch caused the gasket to rapidly deteriorate, and thus quickly rendered the gasket ineffective as a seal and necessitated frequent gasket replacement. Furthermore, where the gasket was employed to seal a leak in a gas or oil pipe, the deterioration initiated by the stretching was supplemented and quickened by the deteriorating action of the gas or oil on the rubber, so that the two destructive factors or stretching and deterioration by gas and oil very quickly rendered the gasket ineffectual as a seal.

It is therefore the primary object of this invention to provide a gasket wherein the necessity for stretching and the susceptibility to deterioration are reduced to a minimum.

A further object is to provide a gasket of this character which is molded in a curvature substantially conforming to the circumference of the pipe on which it is to be used, so that stretching and bending thereof in application and use is reduced to a minimum.

A further object is to provide a gasket of this character to which is applied a layer of flexible material which is relatively resistant to deterioration by gas and oil and which forms at least a part of the pipe-engaging face of the gasket.

A further object is to provide a molded rubber gasket with a portion of a gas and oil resisting rubber-like material vulcanized thereto to form at least a part of the pipe-engaging face of the gasket, which is sufficiently soft to conform with the surface of a pipe to form an effective seal when subjected to pressure, and which is adapted to be positioned relative to the leaking pipe to cover at least the leaking area thereof.

Other objects will be apparent from the description and the appended claims.

In the drawing:

Figure 1 is a transverse sectional view of a pipe and clamp illustrating my improved gasket in connection therewith.

Figure 2 is a perspective view of the gasket illustrating the sectional construction of a modified form of my gasket.

Figure 3 is a perspective view of a gasket illustrating the sectional construction of another modified form of my gasket.

Referring to the drawing, which illustrates the preferred embodiment of the invention, and particularly to Fig. 1 thereof, the numeral 10 designates a conventional pipe having a leak in the body thereof which is diagrammatically illustrated at 11. Encircling the pipe at the leaking portion thereof is a pipe clamp 12, which may be of any conventional construction and which is here illustrated as comprising two halves 13 whose semi-circular inner surfaces are of substantially the same radius as the exterior surface of the pipe. Each of the clamp halves is provided with a pair of opposed outwardly directed aligned flanges 14, reinforced by webs 15, at its longitudinal edges. The clamp halves are interconnected and operatively drawn together to tightly grip the pipe by bolts and nuts 16 which pass through aligned apertures 17 in flanges 14. The use of a clamp whose parts closely fit on the pipe as described and shown provides a large surface area engagement of at least one half 13 thereof with the pipe to insure firm seating and gripping thereof on the pipe and to minimize the possibility of displacement of the clamp from the leaking pipe area or turning of the clamp about the pipe.

A leak sealing gasket 20 is interposed between the clamp 12 and pipe 10 to cover the leaking area 11 of the pipe, as is conventional. The gasket 20 is formed of rubber, and I prefer to preshape or mold the same to conform substantially to the shape of the space it occupies between the pipe and the clamp. Thus the inner and outer faces of the gasket are curved in cross section, the radius of the curvature of said faces being substantially equal and producing a gasket body which is of maximum thickness at its center and whose thickness progressively decreases from its center to its sides. It will be obvious that the shaping of the gasket in this manner enables it to be readily applied to use, and eliminates bending or stretching of the gasket body in application. Therefore the gasket is subjected merely to compressing stress for the purpose of effecting a tight sealing engagement between itself and the pipe while in use.

For the further improvement of the gasket, I form the same, in part, from a flexible sealing material which is comparatively resistant to deterioration by gas and oil. Thus I have illustrated in Fig. 1 the provision of an inset layer 21 of such deterioration-resisting material, which layer forms a part of the inner or concave face of the gasket. Various materials are suitable for this layer, but I prefer therefor a synthetic rubber-like material which possesses the desired deterioration-resisting qualities, which is flexible and resilient, and which will vulcanize to rubber. Such a material is now marketed under the trade-mark "Duprene", and possesses all the characteristics required for successful use in this invention, including a sufficient degree of resiliency and softness to permit the surface thereof which bears on the leaking pipe to shape itself in a substantially flowing action, when under pressure of the pipe clamp 12, to the exact surface contour of the pipe. In other words, this material will conform under pressure to the minute surface irregularities of the pipe to insure a positive sealing engagement thereof with the pipe. This synthetic rubber-like material becomes an integral part of the gasket, possesses all the advantages and characteristics of rubber per se, and additionally possesses the advantage of relative resistance to deterioration by the gas and oil which leaks from the pipe at the portion 11 thereof for the sealing of which the gasket is employed. The inset layer 21, by forming only a portion of the pipe-engaging face of the gasket, reduces to a minimum the cost of the complete gasket by limiting application of the comparatively expensive deterioration-resisting material to the locus of greatest danger of deterioration. It will be understood, however, that the layer 21 may also be formed of lead or other deterioration-resisting metal suitably treated to adhere to the rubber body of the gasket and sufficiently flexible to effect a tight sealing engagement with the pipe surface at and adjacent the leaking area 11 thereof upon application of pressure to the gasket 20 by the clamp 12.

A modified embodiment of the invention is illustrated in Fig. 2. In this embodiment the gasket 20 is provided with an inset 25 of deterioration-resisting material which is of greatest thickness at its longitudinal center portion and which progressively decreases in thickness from its center to its side portions. The thick center portion of the layer 25 is adapted to be placed directly over the leaking portion 11 of the pipe at which the greatest possibility of deterioration exists, and insures protection of the gasket at this critical point by the provision of a sufficient thickness of the deterioration-resisting material to positively protect the remainder or rubber body of the gasket. The reduced thickness side portions of layer 25 are effective to prevent deterioration of the gasket at points spaced from the pipe leak 11 to which oil or gas might possibly seep, but at which points the small quantity of the seepage reduces the danger of deterioration, and only a small amount of the deterioration-resisting material is required. The deterioration-resisting material, and particularly "Duprene", is much more expensive than rubber, and this particular embodiment of the invention therefore reduces to a minimum the cost of the gasket while at the same time affording protection against deterioration proportional to the need therefor.

A second modified embodiment of the invention is illustrated in Fig. 3. This embodiment contemplates the utilization of a deterioration-resisting material 30 in sheet form, vulcanized or otherwise secured or adhering to the concave face of the rubber body 20 of the gasket, to form the entire pipe-engaging surface of the gasket. This embodiment is of particular value for application to a pipe in which there is a large area of leak or a leaking pipe area is comprised of a number of small spaced leaks.

I claim:—

1. A gasket adapted to overlie the leaking area of a pipe and to be pressed thereagainst by a pipe encircling clamp, comprising a rubber body of preformed arcuate shape having an inner face substantially conforming to the curvature of the outer face of the pipe and an outer curved face eccentric of said inner face substantially conforming to the curvature of the inner face of the clamp whereby the thickness of the gasket reduces from its center to its sides, said gasket effectively sealing said leaking area upon application of pressure thereto sufficient to force the inner face thereof into full face engagement with said pipe but without substantial deforming thereof.

2. Means for sealing the leaking area of a pipe, comprising a clamp formed of a plurality of interconnected sections whose faces are of substantially the same radius as the outer surface of said pipe, and a preformed rubber gasket whose inner and outer faces are of substantially equal radius and whose centers are spaced approximately equal to the major thickness of the gasket, whereby the thickness of said gasket decreases from its center to its sides and the opposed faces thereof normally lie in substantially full face engagement with said pipe and one clamp section to effectively seal said leak upon application of minimum clamp pressure, at least one of said clamp sections bearing in substantially full face engagement on said pipe opposite said gasket to minimize slipping of said sealing means on said pipe.

PATTERSON D. MERRILL.